Figure 1:
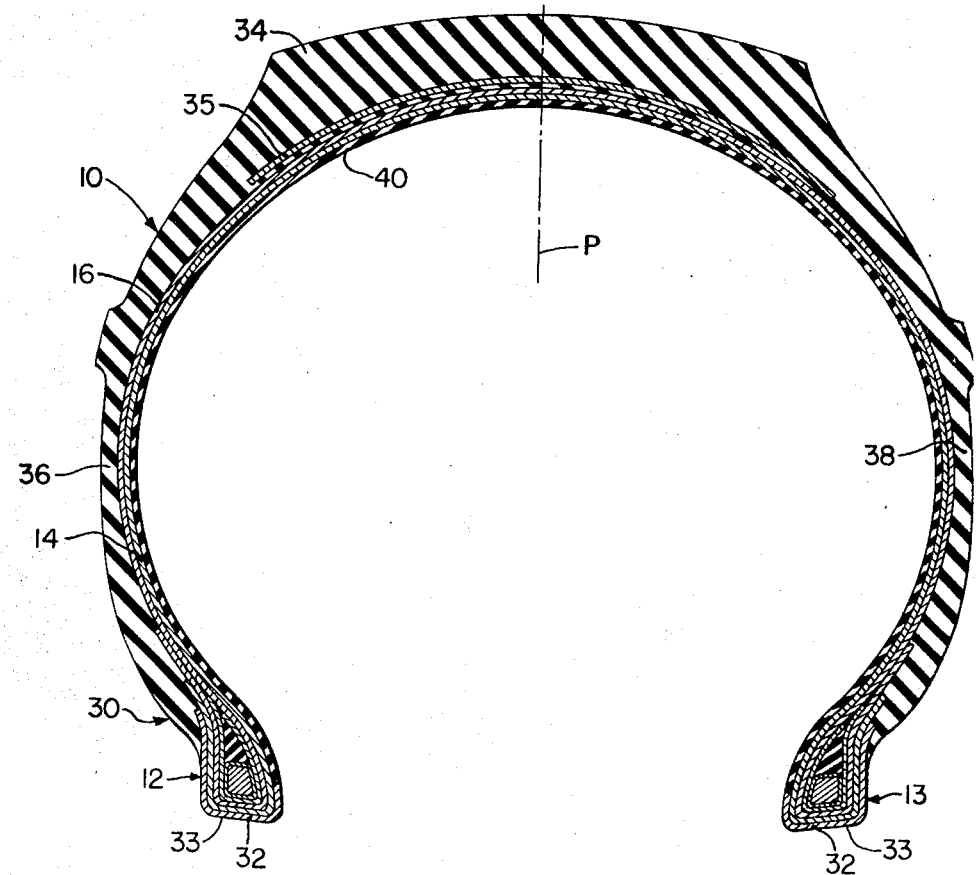

United States Patent

[11] 3,548,912

| [72] | Inventors | Grover W. Rye<br>Cuyahoga Falls;<br>Michael F. Dague, Akron, Ohio |
|---|---|---|
| [21] | Appl. No. | 731,379 |
| [22] | Filed | May 23, 1968 |
| [45] | Patented | Dec. 22, 1970 |
| [73] | Assignee | The Goodyear Tire & Rubber Company<br>Akron, Ohio<br>a corporation of Ohio |

[54] REDUCED NOISE LEVEL TIRE
13 Claims, 2 Drawing Figs.

[52] U.S. Cl. .................................................. 152/362
[51] Int. Cl. ................................................... B60c 9/10
[50] Field of Search ....................................... 152/354,
362, 355, 356, 359

[56] References Cited
UNITED STATES PATENTS

| 2,752,980 | 7/1956 | Riggs | 152/362 |
| 3,038,518 | 6/1962 | Hershey | 152/362 |
| 3,106,952 | 10/1963 | Rudder | 152/362 |
| 3,397,729 | 8/1968 | Sperberg | 152/354 |

*Primary Examiner*—James B. Marbert
*Attorneys*—F. W. Brunner and R. S. Washburn ABSTRACT: A pneumatic tire having notably improved capability for inhibiting noise and vibration transfer between the tire and a vehicle wheel on which the tire is mounted comprises successive contiguous layers of cord fabric materials, particularly between the bead cores and the bead portion surfaces engaging a wheel. Cord material is one of the layers, which includes the carcass reinforcing ply or plies, differs from the cord material of the next adjacent ply in energy absorption characteristics as represented by sound transmissibility, or hysteresis loss.

PATENTED DEC 22 1970　　　　　　　　　　3,548,912

INVENTORS
MICHAEL F. DAGUE
GROVER W. RYE
BY
R. Washburn
AGENT

3,548,912

REDUCED NOISE LEVEL TIRE

The foregoing abstract is not to be taken as limiting the invention of this application, and in order to understand the full nature and extent of the technical disclosure of this application, reference must be made to the accompanying drawing and the following detailed description.

This invention relates to a pneumatic tire and particularly to a pneumatic tire having novel and improved capabilities for inhibiting vibrations communicated between the tire and a wheel on which the tire is mounted. Conventional pneumatic tires heretofore known and used have been found to communicate objectionable amounts of vibration to certain vehicles on which such tires are mounted. In particular, vibrations in the frequency range of 160 to 200 cycles per second are communicated from the tire to the wheel and to the vehicle on which the tire is mounted in such a manner as to produce unpleasant or objectionable noise within the vehicle.

A principal object of the invention is to produce a tire capable of inhibiting vibration communicated by the tire to the wheel upon which the tire is mounted, particularly vibrations in a frequency range of 160 to 200 cycles per second, while in no way unfavorably affecting the performance of the tire in other respects.

Figure 2:
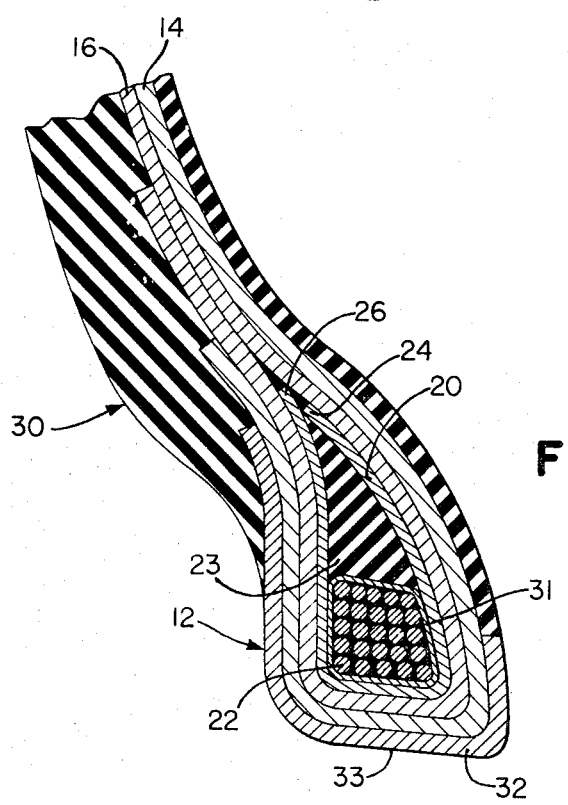

Other Objects and features of advantage of the present invention will be come apparent or be particularly pointed out in the description which follows taken in connection with the accompanying drawing in which:

FIG. 1 is a transverse sectional view through a tire in accordance with the present invention; and FIG. 2 is a fragmentary view, enlarged, of a portion of the tire shown in FIG. 1.

As is shown in the drawing and particularly in FIG. 1, a tire 10 includes a pair of laterally spaced and relatively inextensible beads 12, 13, and a reinforcing cord ply 14 wrapped around at least one 12 of the beads 12, 13 and extending from that one bead 12 to or toward the other 13 of said beads 12, 13. A tire according to the present invention, may have any number of plies. The tire 10 shown includes a second reinforcing cord ply 16 wrapped around one bead 12, overlying the first ply 14 and extending to the other bead 13. According to one aspect of the present invention the ply 14 includes cords of a first material, for example polyester filaments or nylon filaments, while the next adjacent ply 16 includes cords of a second and different material, for example nylon filaments or polyester filaments. It will be understood that, in a particular tire, one of the plies 14, 16 will be made of cords of polyester filament material while the other of the plies 16, 14 will be made of a different material. Cord fabric materials employed in the practice of the invention are selected from the group consisting of polyesters, nylons, rayons, and glass fiber filament materials. In general, all are synthetic continuous filaments. The synthetic organic filament materials are particularly preferred for the carcass reinforcement ply or plies 14, 16.

In the drawing, and particularly in FIG. 2, there is shown a fabric element or layer 20, referred to as a flipper, which is wrapped around the bead core or grommet 22, which may include an apex strip 23, so that each marginal edge 24, 26 of the flipper 20 extends radially outward into the clinch portion 30 of the tire sidewall. As will presently appear, the use of a flipper is optional within the scope of the present invention. When used, however, the flipper 20 lies between the bead core 22 and the reinforcing ply 14 wrapped about the bead most closely thereto. According to a further aspect of the invention a layer 31 of material differing in noise or sound transmission effect from the material of at least one of the piles 14, 16 is wrapped snugly about the bead core 22. The bead wrapping layer 31 lies between the bead core 22 and the flipper layer 20, as well as between the bead core 22 and the bead sole 33. Where the flipper 20, if used, is of nylon cord material, the bead wrapping layer is preferably of polyester or rayon cord material, either layer 20, 31 or both are of different material from the cord of the ply 14, particularly in respect of sound transmissibility. Overlying the ply or plies 14, 16 which are themselves wrapped about the bead 22 is a further fabric layer 32 usually called a chafer which serves the usual function of a chafer in conventional tires, which is the protection of the reinforcing plies from fretting or abrasion or other damage due to the interaction of a tire and a wheel rim or felloe (not shown) on which the tire is seated. The surface 33 of the tire which engages the wheel rim is usually referred to as the bead sole and for convenience the term sole 33 will be used within this specification and the claims which follow. Within the scope of the present invention, a chafer may or may not be used.

The tire 10 shown in FIG. 1 includes further a tread portion 34 and opposed sidewall portions 36, 38 as well as the liner 40 which is optional insofar as the present invention is concerned but which liner is customarily used in tires of the tubeless type. The tire may include further reinforcement in the form of a ply or plies 35 disposed in the tread portion 34 or between the thread portion 34 and the reinforcing plies 14, 16 comprising the carcass. The ply or plies 35 extend less than the full transverse distance from one to the other of the beads. The ply 35 will serve as a breaker ply, having cords oriented at relatively large acute angles with the midrotational plane P of the tire, perpendicular to the rotational axis. Alternatively, the ply 35 will be a restrictive ply or belt having cords making relatively small angles at and with the midrotational plane P.

The carcass plies 14, 16, insofar as the present invention is concerned, may extend radially from the beads and substantially perpendicular to the midrotational plane P or may extend between the beads so as to cross the midrotational plane P at acute angles. Moreover, the invention finds utility in tires constructed with high or low profile. Profile, as used here, refers to the value of the ratio of the section height to the section width of the tire cross section.

In accordance with the present invention, a tire having significant reduction in noise transmission is achieved by superposing successive layers of differing fabric materials, particularly about the bead portions of the tire, the synthetic fabric materials employed differing particularly in their capacity or ability to transmit vibration. Still more specifically, the superposed plies or layers of differing fabric or filamentary materials lie between the bead 22 and the sole 33. The materials of construction and particularly the fabric or cord fabric used in the plies 14, 16, the flippers 20, the bead wrapper 31, and the chafer 32 are selected from suitable and desirable available fabric materials. Among available fabric and cord materials there are found to be significant differences in ability to transmit sound energy.

The surprising and unexpected benefits of the invention in inhibiting or attenuating vibration or noise between a tire embodying the present invention and a wheel is attributed, at least in part, to the differences in energy absorption in sound transmission of tire cord materials. Despite the small distance represented by the thickness of the cord fabric layers through which the sound energy may be expected to travel, and the fact that tire cord materials such as the polyesters, the rayons, the nylons, and fiber glass filaments are relatively efficient in transmitting sound or vibration energy, means effective to inhibit or to attenuate noise transmission has now been achieved by the juxtaposition of dissimilar layers of material in a tire body. The layers are of any textile construction but preferably of cord fabric in which the filaments comprising the yarns of the cord of one layer differ in physical characteristics such as sound transmission effect or a hysteresis from the filaments composing the cords of a next adjacent or contiguous layer. The juxtaposition of layers of different material is found to be particularly effective in the bead portions of a tire, the dissimilar layers being disposed successively between the bead core 22 and the bead sole 33. Reductions in sound level output of from 7 to 10 decibels are achieved in tires in accordance with the present invention as compared with tires of the prior art, in which sound level output measurements of as much as 84 to 86 decibels are commonly found.

The noise transmission characteristics of differing materials can be readily determined by routine laboratory methods. For example, by extending a predetermined length of material such as a reinforcement cord under tension between a sound generator emitting a pure tone and a vibration pickup or transducer, the sound energy input at one end of the sample is determined and is compared to the sound energy output at the other end of the sample. The loss in energy represented by the difference in the two measurements or the ratio of the two measurements which is the efficiency of noise transmission may be compared with like measurements taken on another cord.

Materials selected to form the superposed contiguous layers, such as the ply 14 and flipper 20, or the ply 16 and the chafer 32, or ply 14 and ply 16, as described hereinabove, can differ as well in energy damping capacity or in energy absorbed in hysteresis under tension-relaxation cyclic loading. Using dissimilar fabrics disposed in face-to-face contact within the tire, and particularly in the bead portions 12, 13 and between the bead core 22 and the bead sole 33 results in very satisfactorily damping of unwanted frequency of noise and appears to effect a noise filtering effect to broaden the range of frequencies which are damped. Determination of differences in hysteresis effect can be made by well known and conventional methods.

The invention is further illustrated by the following examples; in which the three-digit numbers in parentheses represent the particular tires tested.

An 8.55 x 14 tire (142) including two plies 12, 14, each of 28 ends per inch (epi) of 1100/3 polyester cords, one 4-inch nylon flipper 20, a full bead wrap 31, and a nylon chafer 32 of 1260/3 cord fabric was constructed, cured and tested in comparison with a control with the following results:

|           | 30 m.p.h. | 40 m.p.h. | 50 m.p.h. |
| --------- | --------- | --------- | --------- |
| (142)     | 6.0       | 5.5       | 5.0       |
| (Control) | 5.0       | 4.0       | 3.0       |

The number scale represents evaluations of noise transmission between tire and vehicle by experienced tire-test drivers. The higher the number the better the performance of the particular tire in the characteristic being tested. The number scale used in the following examples has the same significance.

EXAMPLE II

An 8.55 x 14 tire (122) including two plies 14, 16, each of 25 epi of 1300/3 polyester cords, and one chafer 32 of 28 epi of 1260/3 nylon cord fabric was constructed, cured and tested in comparison with a control with the following results:

|           | 30 m.p.h. | 40 m.p.h. | 50 m.p.h. |
| --------- | --------- | --------- | --------- |
| (122)     | 5.5–6.0   | 4.5–5.0   | 4.0–4.5   |
| (Control) | 4.0       | 4.0       | 3.0       |

EXAMPLE III

An 8.55 x 14 tire (118) including two plies 14, 16, each of 25 epi of 1300/3 polyester cords, and two flippers 20, each of 28 epi of 1260/2 nylon cords was constructed, cured and tested in comparison with a control with the following results:

|           | 30 m.p.h. | 40 m.p.h. | 50 m.p.h. |
| --------- | --------- | --------- | --------- |
| (118)     | 5.5       | 4.0       | 3.5       |
| (Control) | 5.0       | 4.0       | 3.0       |

EXAMPLE IV

A group of 8.55 x 14 tires (072) including two plies 14, 16 of polyester cord fabric, a flipper 20 of doubled nylon cord fabric, and a chafer 32 of doubled multifilament square woven nylon fabric were constructed, cured and tested with the following results:

|           | 30 m.p.h. | 40 m.p.h. | 50 m.p.h. |
| --------- | --------- | --------- | --------- |
| (072) 1   | 5.5       | 5.0       | 4.5       |
| (072) 2   | 5.5       | 4.5       | 4.0       |
| (072) 3   | 5.5       | 5.0       | 4.5       |
| (072) 4   | 5.5       | 5.0       | 4.5       |
| (072) 5   | 5.5       | 5.0       | 5.0       |
| (072) 6   | 5.5       | 5.0       | 4.5       |
| (Control) | 4.0       | 4.0       | 3.0       |

EXAMPLE V

Two 8.55 x 14 tires (094, 095) including two plies 14, 16, one of polyester cord and one of nylon cord, were constructed, cured and tested with the following results:

|           | 30 m.p.h. | 40 m.p.h. | 50 m.p.h. |
| --------- | --------- | --------- | --------- |
| (094)     | 6.0       | 5.5       | 5.0       |
| (095)     | 6.0       | 5.0       | 5.0       |
| (Control) | 4.0       | 4.0       | 3.0       |

EXAMPLE VI

An 8.55 x 14 tire (119) including two plies 14, 16 of 25 epi of 1300/3 polyester cord, and full bead wrapping layer 31 of 28 epi of 1260/2 nylon was constructed, cured and tested with the following results:

|           | 30 m.p.h. | 40 m.p.h. | 50 m.p.h. |
| --------- | --------- | --------- | --------- |
| (119)     | 5.5       | 4.0       | 3.5       |
| (Control) | 4.0–5.0   | 4.0       | 3.0       |

Tires constructed as described in the preceding examples were subjected to sound level test measurements, according to a conventional test procedure, and found to produce, within the test vehicle upon which the tires were mounted, from seven decibels to 10 decibels less noise than control tires which produced sound level measurements of 84 to 86 decibels, and most objectionably, peak intensities in the 160 to 200 cycles per second portion of the sound spectrum. While certain representative embodiments and details have been shown for the purpose of illustrating the invention, it will be apparent to those skilled in this art that various changes and modifications may be made therein without departing from the spirit or scope of the invention.

We claim:

1. A pneumatic tire including a pair of inextensible bead cores and a carcass reinforcing cord ply of cord fabric or organic filamentary material wrapped around one of the bead cores and extending toward the other bead core means for attenuating noise communicated between the tire and a wheel on which the tire is mounted comprising a layer of cord fabric disposed contiguously to said ply composed of filaments of a synthetic material having sound absorption characteristics different from the sound absorption characteristics of the filamentary material of said ply.

2. A pneumatic tire having notably improved ability to inhibit noise transmission between the tire and a wheel on which the tire is mounted for use comprising a pair of relatively inextensible beads, a reinforcing cord ply wrapped around one of said bead and extending from one toward the other of said beads, the cords of said ply comprising filaments of a first material, and a layer comprising filaments of a second material wrapped around said one of said beads contiguous with said ply, said first material differing from said second material in sound transmissibility.

3. A pneumatic tire having improved noise attenuation characteristics and having a pair of relatively inextensible beads, comprising a reinforcing cord ply wrapped around one of said beads and extending from said one toward the other of said bead, the cords of said ply comprising filaments of polyester, and a layer wrapped around one of said beads contiguously to said ply, said layer comprising a filamentary material selected from the group consisting of nylon, rayon and glass fiber, said group being characterized by sound transmissibility differing from the sound transmissibility of polyester.

4. A pneumatic tire as claimed in claim 1 wherein said layer comprises a second carcass ply wrapped about said one bead and extending toward the other bead.

5. A pneumatic tire as claimed in claim 4 wherein the said ply comprises cord fabric of polyester cords and said second ply comprises cord fabric of nylon cords.

6. A pneumatic tire as claimed in claim 1 wherein said layer comprises a flipper of cord fabric wrapped about said bead core between said core and said ply.

7. A pneumatic tire as claimed in claim 6 wherein said ply comprises cord fabric of polyester cords and said flipper comprises cord fabric or nylon cords.

8. A pneumatic tire as claimed in claim 1 wherein said layer comprises a chafer of cord fabric wrapped in face-to-face contact with said ply around said bead core between said ply and the bead sole.

9. A pneumatic tire as claimed in claim 8 wherein one of said ply and said chafer is or polyester and the other of said ply and said chafer is selected from the group consisting of nylons, rayon, and glass filament fabrics.

10. A pneumatic tire as claimed in claim 1 wherein said layer comprises a bead core wrapping layer of cord fabric wrapped snugly about said bead core between said core and said ply.

11. A pneumatic tire as claimed in claim 10 wherein one of said wrapping layer an said ply is of polyester cord fabric and the other is a cord fabric selected from the group consisting of nylon, rayon, and glass filament fabrics.

12 A pneumatic tire as claimed as in claim 1 further comprising a plurality of pairs of contiguous layers including said ply, each of said pairs of layers disposed around said bead core and between said core and the bead sole comprising a layer including cord fabric of a first material and a layer including cored fabric of a second material, said first and said second materials having significantly different abilities for absorbing sound energy.

13. A method of attenuating vibrations communicated between a wheel and a pneumatic tire mounted thereon which method comprises placing immediately adjacent one another in the tire prior to curing thereof two layers of filament reinforcement material, the filaments whereof have significantly differing sound absorption characteristics.